July 18, 1961  F. KLEGER  2,992,579
MACHINES FOR CUTTING OUT EMBROIDERIES
Filed Dec. 18, 1957
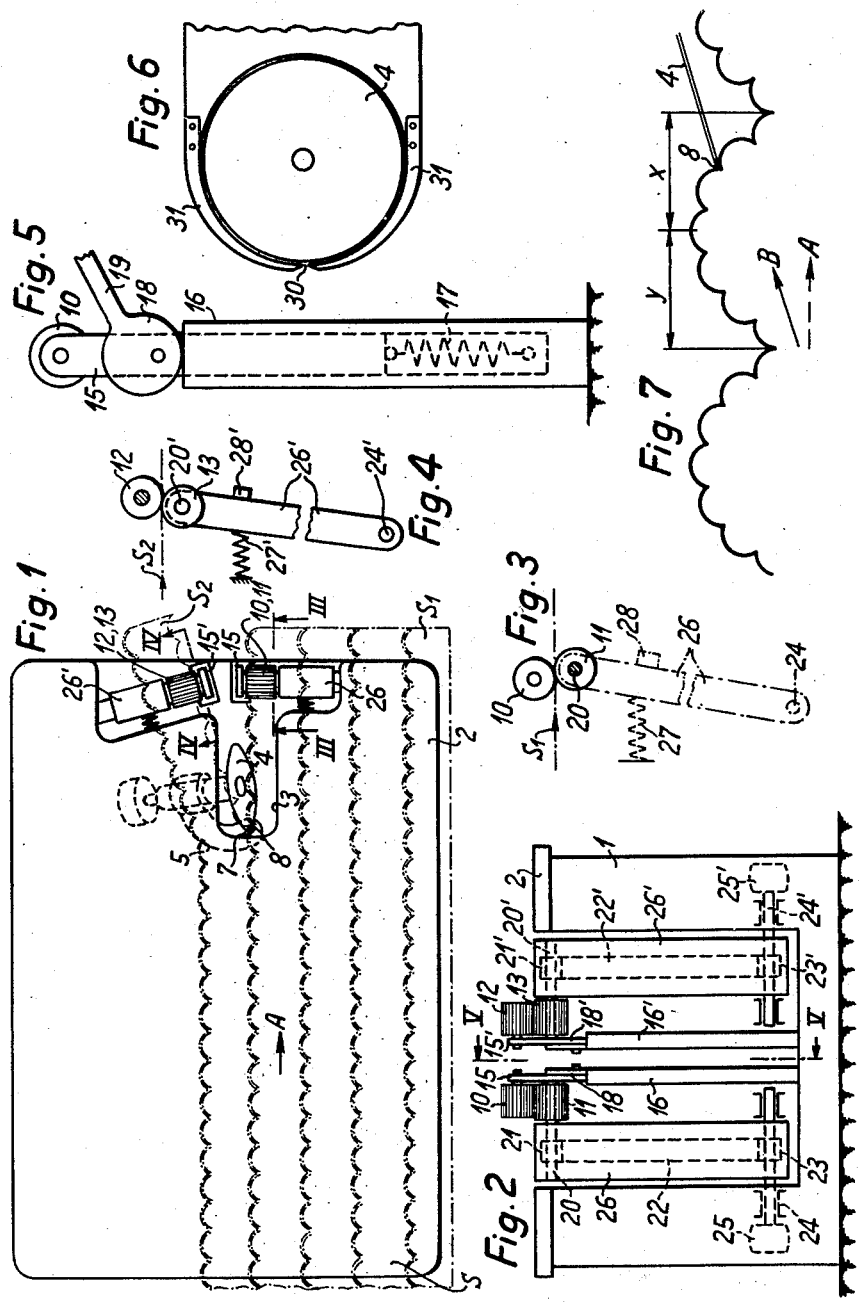

United States Patent Office 2,992,579
Patented July 18, 1961

2,992,579
MACHINES FOR CUTTING OUT EMBROIDERIES
Ferdinand Kleger, 2 St. Gallerstrasse, Rorschach, St. Gallen, Switzerland
Filed Dec. 18, 1957, Ser. No. 703,606
Claims priority, application Switzerland Dec. 19, 1956
2 Claims. (Cl. 83—107)

The present invention relates to a machine for the cutting out of embroideries.

It is a main object of the present invention to provide a machine of the kind referred to wherein the cutting knife is safely prevented from damaging the scallop of the embroidery.

It is another object of the invention to provide a machine of the kind referred to wherein a feeler can be adjusted to a favorable angle corresponding to the actual shape of the scallop.

It is yet another object of the invention to provide a machine of the kind referred to wherein the said feeler is adjustable in the lateral direction with respect to rollers through which the embroidery is moved.

It is still another object of the invention to provide a machine of the kind referred to wherein the rotational speed of the said rollers can be chosen in accordance with the complication of the shape of the actual scallop.

It is moreover an object of the invention to provide a machine of the kind referred to wherein the ratio of the rotational speed of two pairs of rollers arranged side by side can be adjusted accurately in proportion to the angle of the scallop to be cut.

It is finally another object of the present invention to provide a machine of the kind referred to wherein the pressure of the said rollers on the fabric can be adjusted in accordance with the sort and thickness of the said fabric.

With these and other objects in view, which will become apparent later in this specification, I provide a machine for cutting out embroideries, comprising in combination: a stationary framework, a table top having a cutout fitted to this frame work, a rotary cutter knife and at least two pairs of feeder rollers, journalled on said framework adjacent said cut-out, one roller of each pair being superimposed to the other of the same pair, one of the said pairs serving for conveying the embroidered breadth of fabric and the other the cut-off strip of embroidery, and one roller of each pair being driven motorically, one roller of each pair being journalled moveably at least approximately perpendicular to the direction of conveying said breadth of fabric and strip of embroidery, respectively, the said moveably mounted roller of the pair for conveying the said breadth of fabric being forced against the said fabric upon the pull applied thereto exceeding the force required for conveying the same, while the said moveable roller of the pair conveying the said strip of embroidery is pulled off its associated roller at the same time.

These and other features of the present invention will become clear from the following description of a preferred embodiment thereof, given by way of example with reference to the accompanying drawing, from which all parts not essential for the understanding of the invention have been omitted for clarity. In the drawing:

FIG. 1 is a plan view,
FIG. 2 is a side elevation,
FIGS. 3 and 4 are sections on the lines III—III and IV—IV, respectively, of FIG. 1.
FIG. 5 is a section on the line V—V of FIG. 2.
FIGS. 6 and 7 show details on a larger scale.

The machine according to the present embodiment comprises a framework 1, which is preferably closed outwardly, and which is covered by a table top 2. Through a cutout 3 of the table top 2 projects a circular cutter knife 4 which is driven at high rotational speed by a motor (not shown). The knife 4 is as a rule slightly inclined to the vertical. The knife 4 is adjustable parallel to itself in the horizontal direction in order that its cutting point 8 may be adjusted in relation to the feeder rollers 10, 11 and 12, 13 corresponding to the height of the embroidery. Moreover the rotary spindle of the knife is journalled in a bracket 5, which is pivotally mounted about a pivot pin 7 positioned below the cutting point 8 of the knife 4, in order that this point may not change its location. The embroidered breadth of fabric S is supplied to the cutter knife 4 from the left hand side of FIG. 1, usually by hand.

Viewed in the direction of feed of the breadth of fabric are arranged after the knife 4. The rollers 10 and 11 S, two pairs of rollers 10, 11 and 12, 13, respectively, serve for conveying the breadth of fabric $S_1$ reduced in width by one strip, while the rollers 12 and 13 serve for conveying the strip of embroidery $S_2$ cut off. The parts $S_1$ and $S_2$ are put at the beginning of an operation between the corresponding pairs of rollers, as usual in the known machines of this kind. In order that this may be done quickly, a device (not shown) operatable by a pedal may be provided, by means of which the upper rollers 10, 12 serving as presser rollers may be quickly lifted off the lower rollers 11, 13, respectively.

The roller 10 is journalled freely rotatably on a support 15. The latter is guided vertically shiftably in a casing 16 and is subject to the action of a tension spring 17 which tends to force the upper roller 10 down on to the lower roller 11. On the support 15 an eccentric 18 is journalled rotatably which has a handle 19. The object of this eccentric will be described later. In the analogous manner also the roller 12 is journalled which fact is indicated in FIG. 2 by the characters 15', 16' and 18'.

The lower roller 11 is fixedly mounted on a shaft 20 which carries moreover a belt pulley 21. The shaft 20 is journalled in an arm 26 which preferably is positioned obliquely, in the interior of which there is, in addition to the pulley 21, a further belt pulley 23 and a belt passed over both pulleys. The belt pulley 23 is fixedly connected to a shaft 24, about which the said arm 26 is pivoted. A pulley 25 serves for driving the shaft 24. A compression spring 27 tends to hold the arm 26, and accordingly the roller 11, in one end position defined by an abutment 28. In an analogous manner also the roller 13 is journalled and driven the individual parts of this arrangement being denoted 20'—28'. However, it is important that the center lines of the rollers 10 and 11 include an obtuse angle with the center lines of the rollers 12 and 13, as shown in FIG. 1. Moreover it is of a particular importance that the center line of the roller 11 as viewed in the direction of the movement of the breadth of fabric S lies in the normal working position somewhat behind the center line of the presser roller 10 (FIG. 3), while the center line of the roller 13 as viewed in the same direction lies slightly before the center line of the presser roller 12 (FIG. 4). The object of this arrangement will be described later. The belt pulleys 25 and 25' receive their rotary motion from a motor (not shown). Between the latter and the pulley 25' preferably a speed variator gearing is arranged which permits to run the roller 13 at various steplessly selected rotational speeds.

In order that the cutter knife 4 may not damage the scallop of the embroidery, in all machines of this kind guides are provided which serve as feelers, the slot 30 of which is so narrow that the fabric arriving for being cutout can pass, while, however, the thicker scallop can not. As guides preferably circular arc shaped segments 31 are used, which are exchangeable and apply with minimum clearance to the circumference of the knife (FIG. 6).

The manner of operation of the machine is as follows:

Firstly a cut is made with a pair of scissors at the beginning of the breadth of fabric S, so that accordingly separate parts $S_1$ and $S_2$ exist from the outset. These starting portions are put between the rollers 10, 11 and 12, 13, respectively, the severing point of these parts of the fabric lying of necessity at the cutting point 8 at the slot 30. The driving members for the rollers 11, 13 are switched on, while the knife rotates permanently. Thereby, as is the case with the known machines, by the rollers 10 and 11, the breadth of fabric $S_1$ is pulled along and by the rollers 12 and 14 the strip of embroidery $S_2$ cut out by the knife 4 rotating at high rotational speed, in the direction of the arrow A (FIG. 1). The roller 13 rotates preferably at a higher rotational speed than the roller 11. Consequently there exists permanently the tendency of the breadth of fabric being pulled more strongly in the direction of the arrow B (FIG. 7) than in the direction of the arrow A. This has the effect that the scallop is safely pulled towards the cutting point 8 of the knife 4. Consequently an accurate cutting-out of the fabric is effected along the rear scallop (without the latter being damaged, owing to the segments 31).

The major pull on the cut-out strip $S_2$ can, however, have the effect that the depressions in the so-called ascending part of the scallop (FIG. 7) get stuck on the segments 31, and consequently the entire breadth of fabric comes to a standstill. In the very moment when this should occur, the pull in the breadth of fabric $S_1$ and in the strip $S_2$ increases. The consequence thereof is that the roller 13 (FIG. 4) is pulled away below the presser roller 12, namely by rocking the arm 26' about the shaft 24'. Since, however, the roller 12 bears on the casing 16' through the support 15' and the eccentric 18' the former remains in its level position adjusted to. Thereby the pressure between the rollers 12 and 13 ceases, and consequently also at once the pull in the strip $S_2$ ceases.

At the same moment, however, also the pull in the breadth of fabric $S_1$ increases, and the roller 11 has the tendency of pushing itself under the roller 10 by rocking the arm 26. In this position, however, the pressure between the rollers 10 and 11 increases. This additional pull in the direction A effects the further transport of the breadth of fabric. At this moment normal pull conditions are reestablished, and on appropriately dimensioned spring 27' brings the roller 13 back into the position illustrated (FIG. 4).

This mutual interplay between the two driven rollers 11 and 13 repeats itself theoretically at any depression in the ascending portion $x$. With a correct adjustment of the machine practically nothing is to be seen of this change, since it is the question of short and very rapid movements of the rollers 11 and 13.

In the descending portion $y$ of the scallop (FIG. 7) it is downright necessary that the roller 13 runs faster, since the development of the scallop from the highest to the lowest point is longer than the linear path of the breadth of fabric in the direction A. By this increased speed it can be prevented that outside the scallop remnants of the fabric are left standing.

By the aforesaid correct adjustment of the machine is to be understood that:

Firstly the feeler is adjusted at the most favorable angle corresponding to the shape of the scallop;

Secondly the feeler has to be adjustable in the direction laterally of the rollers;

Thirdly the rotational speed of the rollers 11 and 13 has to be chosen corresponding to the complication of the shape of the scallop;

Fourthly the ratio of the rotational speeds of the rollers 11 and 13 with respect to one another is to be adjustable exactly in proportion of the angle of the scallop to be cut, which may be effected by the said variator gearing.

Finally the pressure of the rollers 10 and 12 on to the fabric by the spring 17 is to be adjustable accurately in accordance with the kind and thickness of the fabric. For this purpose serve likewise the eccentrics 18 and 18'.

As will be seen from FIG. 5, by turning the eccentric 18, the roller 10 can be raised in opposition to the action of the spring 17. After inserting the fabric between the rollers 10 and 11 (and this applies in an analogous manner also to the rollers 12 and 13) by turning the eccentric the presser roller 10 can be lowered on to the roller 11 and the fabric inserted in between, respectively. Depending on the adjustment of the eccentric the pressure force of the roller 10 may vary; as a maximum this force corresponds to the force of the spring 17, disregarding the proper weight of the components 10 and 15.

For conveying the breadth of fabric $S_1$ alternatively e.g. two pairs of rollers could be provided which then must operate accurately in harmony. Moreover there exists the possibility of using tension springs instead of the compression springs 27 and 27', the pre-loading being made preferably adjustable in any case.

While I have described herein and illustrated in the accompanying drawing what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent is:

1. A machine for cutting embroidery, comprising a work table having a cut away portion defining a longitudinal slot, a disc-like rotary cutter mounted in said slot, a pair of levers rockably mounted beneath said table to move in the direction of said slot, feed rollers journaled on the upper ends of said levers and arranged adjacent opposite sides of said slot, yielding means for urging said levers in a direction away from said slot, presser rollers mounted above each of said feed rollers and resiliently urged forward, one of said feed rollers being arranged to feed the uncut portion of said embroidered fabric while the other feed roller is arranged to feed the cut strip of embroidery in an oblique direction with respect to said slot and the direction of fabric movement, a stop member positioned to engage the lever 4, the feed roller for feeding the uncut portion of said fabric so that it is normally mounted slightly in advance of its corresponding presser roller, the feed roller for said cut strip of fabric being arranged in advance of its corresponding presser roller, independent means for driving the feed rollers at different speeds so that the feed roller for the uncut portion of the fabric will rotate at a slower rate of speed than the other feed roller, the arrangement being such that the cut strip is fed in an oblique direction to urge the uncut portion of the fabric against the embroidered portion and cutter whereupon the feed roller for feeding the cut strip will be moved in a direction toward the cutter and offset rearwardly of a vertical plane passing through the axis of its corresponding presser roller, the other feed roller will likewise have a tendency to move rearwardly and simultaneously will increase the friction between the fabric being fed to again feed the uncut portion of the fabric strip along a straight line path to release the pull on the other feed roller such that the same can again feed the cut strip of fabric along an oblique pathway.

2. A machine for cutting embroidered fabric, comprising a rotary cutter disc, a table having a longitudinal slot mounted above said cutter for receiving the cutting edge thereof, arms rockably mounted beneath said table to swing on a horizontal axis in a direction toward and away from said slot, feed rollers journaled on the upper ends of said arms, independent means for operating said feed rollers so that one will rotate faster than the other, the feed roller rotating at the greatest rate of speed being arranged with its axis oblique to the other roller, presser rollers mounted above said feed rollers with the axis of the presser roller for the slower rotating feed roller arranged in a vertical plane offset rearwardly from the axis of the feed roller and the axis of the other presser roller for the faster rotating feed roller being arranged normally with its axis offset in a vertical plane from the axis of the feed roller, spring means for urging said feed rollers in a direction away from said slot such that their axis is normally in a vertical plane offset from the axis of the presser rollers, and yielding means for resiliently urging the presser rollers downwardly toward said feed rollers, the arrangement being such that the feed roller having the greatest rotational speed will remove the cut embroidered fabric in an oblique direction to one side of the slot and feed the same along an oblique pathway until the uncut portion of the fabric is pulled tightly into engagement with the cutter disc whereupon said faster rotating feed roller will move toward said slot and release the feed pressure on the cut embroidered strip portion of the fabric, whereupon the other feed roller will be brought into tighter frictional engagement with the uncut remaining portion of the embroidered fabric and feed the same along a pathway in a direction parallel to said slot.

References Cited in the file of this patent

UNITED STATES PATENTS

| | | |
|---|---|---|
| 2,779,412 | Albrecht et al. | Jan. 29, 1957 |
| 2,787,677 | Seaman | Apr. 2, 1957 |

FOREIGN PATENTS

| | | |
|---|---|---|
| 1,008 | Great Britain | Mar. 14, 1879 |
| 81,759 | Switzerland | Dec. 10, 1914 |
| 73,333 | Austria | Aug. 15, 1916 |
| 293,989 | Germany | Sept. 7, 1916 |
| 93,791 | Switzerland | Jan. 21, 1920 |
| 974,612 | France | Oct. 4, 1950 |